US006441945B1

(12) United States Patent
Atwater et al.

(10) Patent No.: US 6,441,945 B1
(45) Date of Patent: Aug. 27, 2002

(54) OPTOELECTRONIC DEVICE AND METHOD UTILIZING NANOMETER-SCALE PARTICLES

(75) Inventors: Harry A. Atwater, South Pasadena; Mark L. Brongersma, Altadena, both of CA (US); John W. Hartman, Maynard, MA (US)

(73) Assignee: California of Technology, Pasadena, CA (US)

( * ) Notice: Subject to any disclaimer, the term of this patent is extended or adjusted under 35 U.S.C. 154(b) by 0 days.

(21) Appl. No.: 09/629,037

(22) Filed: Jul. 31, 2000

Related U.S. Application Data

(60) Provisional application No. 60/148,993, filed on Aug. 13, 1999.

(51) Int. Cl.[7] .................. G02B 26/00; G01N 27/26; G01N 27/403
(52) U.S. Cl. .................. 359/296; 204/450; 204/600
(58) Field of Search .................. 359/296; 345/105, 345/107; 204/450, 600

(56) References Cited

U.S. PATENT DOCUMENTS

| | | | | | |
|---|---|---|---|---|---|
| 3,512,876 A | * | 5/1970 | Marks | ....... | 359/296 |
| 4,001,102 A | * | 1/1977 | Batha | ....... | 204/547 |
| 4,125,319 A | * | 11/1978 | Frank | ....... | 359/296 |
| 4,164,365 A | * | 8/1979 | Saxe | ....... | 350/362 |
| 4,422,963 A | * | 12/1983 | Thompson | ....... | 359/296 |
| 5,409,734 A | * | 4/1995 | Lee | ....... | 427/163.1 |
| 5,436,754 A | * | 7/1995 | Ishihara | ....... | 359/240 |
| 5,516,463 A | * | 5/1996 | Check, III | ....... | 252/585 |
| 5,855,753 A | * | 1/1999 | Trau | ....... | 204/484 |
| 6,033,547 A | * | 3/2000 | Trau | ....... | 204/622 |

FOREIGN PATENT DOCUMENTS

| | | | | |
|---|---|---|---|---|
| WO | WO 98/37417 | 8/1998 | ....... | G01N/33/553 |
| WO | WO 01/13149 | 2/2001 | ....... | G02B/6/10 |

OTHER PUBLICATIONS

Dickson, Robert M. et al., Unidirectional Plasmon Propagation in Metallic Nanowires, J. Phys. Chem. B, Jun. 10, 2000, pp. 6095–6098, vol. 104, No. 26, American Chemical Society, XP–000957919.

Jung, C. et al., Electro–optic polymer light modulator based on surface plasmon resonance, Applied Optics, Feb. 20, 1995, pp. 946–949, vol. 34, No. 6, Washington, DC, US, XP–000489996.

(List continued on next page.)

Primary Examiner—Georgia Epps
Assistant Examiner—Gary O'Neill
(74) Attorney, Agent, or Firm—Christie, Parker & Hale, LLP

(57) ABSTRACT

An optoelectronic device and method utilizing nanometer-scale particles arranged along a preselected path, each particle being capable of polarization. The particles are spaced apart such that polarization of one of the particles acts to induce polarization in adjacent particles, enabling electromagnetic energy to be transferred, modulated, filtered or otherwise processed by the device. In a specific embodiment, a chain of such particles may be arranged in a configuration having a variety of different angles, sharp corners and junctions, without adversely affecting device efficiency.

36 Claims, 8 Drawing Sheets

OTHER PUBLICATIONS

Krenn, J.R. et al., Near–field optical imaging the surface plasmon fields of lithographically designed nanostructures, Optics Communications 137, Apr. 15, 1997, pp. 46–50, Elsevier Science B.V., XP–004091514.

Krenn, J.R. et al., Squeezing the Optical Near–Field Zone by Plasmon Coupling of Metallic Nanoparticles, Physical Review Letters, Mar. 22, 1999, pp. 2590–2593, vol. 82, No. 12, American Physical Society, USA, XP–000961620.

Weeber, J.C., Optical Near–Field Properties of Lithographically Designed Metallic Nanoparticles, Materials Research Society Symposium—Proceedings, 2000, pp. 95–100, vol. 571, Materials Research Society, USA, XP–000961407.

Fermigier, Marc and Gast, Alice P.; "Structure evolution in a paramagnetic latex suspension;" Journal of Magnetism and Magnetic Materials; 1993; vol. 122; pp. 46–50; Elsevier Science Publishers.

Marzan, Luis M., Giersig, M., and Mulvaney, P.; "Synthesis of Nanosized Gold—Silica Core—Shell Particles;" American Chemical Society; 1996; vol. 12; pp. 4329–4335.

Quinten, M., Leitner, A., Krenn, J.R., and Aussenegg, F.R.; "Electromagnetic energy transport via linear chains of silver nanoparticles;" Optical Society of America; Sep. 1, 1998; vol. 23, No. 17; pp. 1331–1333.

\* cited by examiner

NO FIELD

US 6,441,945 B1

OPTOELECTRONIC DEVICE AND METHOD UTILIZING NANOMETER-SCALE PARTICLES

CROSS-REFERENCE TO RELATED APPLICATION

This application claims priority from U.S. Provisional Patent Application Serial No. 60/148,993 filed Aug. 13, 1999, entitled "Optoelectronic Propagation and Switching Below the Diffraction Limit."

STATEMENT REGARDING FEDERALLY SPONSORED RESEARCH OR DEVELOPMENT

The U.S. Government has certain rights in this invention pursuant to Grant No. DMR-9871850 awarded by the National Science Foundation.

BACKGROUND OF THE INVENTION

The present invention relates to the transmission and control of electromagnetic energy and, more particularly, to an optoelectronic device utilizing nanometer-scale particles.

In recent years, designers of sophisticated, high speed electronic circuits have become interested in the use of optical signaling, both for its speed and because it virtually eliminates energy loss due to heat. Prior optical systems depend on the principle of total internal reflection, however, making them unsuitable for use when the lateral dimension of a waveguide falls below $\lambda/2n$, which for visible light in glass is approximately 250 nanometers. In many miniature electronic circuits, such as modern high speed microprocessors, the size of electrical conductive paths is already less than half this limit. Also, there are limitations on how sharply conventional optical waveguides can be bent before their transmission properties are lost. Continuous conductive paths are also limited by their inherent electrical resistance when they are made very small. Thus, it is desirable to develop a form of interconnect which can be made much smaller than the diffraction limit and can be formed into arbitrary patterns without sacrificing efficiency.

In a somewhat different field, nanometer-scale particles ("nanoparticles") have been fabricated and given a degree of order using a technique known as "self-assembly." By inducing repulsive forces on close approach and longer range attractive forces on particles in colloidal suspensions, such particles are readily brought into closely packed arrays. An example of this is the colloidal synthesis and arrangement of silica-coated gold particles described by L. M. Liz-Marzan, M. Giersig, and P. Mulvaney in *Langmuir* 12:4329 (1996). In this way, control has been obtained over the orientation of the particles and the spacings between them. Metal colloids useful for this purpose can be obtained from a number of commercial sources.

Linear chains of nanoparticles have been observed in suspensions of polarizable particles subjected to electric fields or magnetizable particles subjected to magnetic fields. Fermigier and Gast, *J.Magn.Mater.*122:46 (1992), confined paramagnetic particles in a narrow channel and examined the structures of the particulate agglomerates that resulted when magnetic fields of different strengths were applied. Induced dipoles caused the particles to be attracted to one another in the direction of the applied field and to repel one another in the orthogonal direction. The addition of surfactant molecules to prevent aggregation facilitated reversible dipole-induced ordering. Individual chains of such particles were not obtained, however, and the arrays were not suggested for use in the transfer of electromagnetic energy.

Thus, a need exists for structures capable of efficiently transferring and controlling electromagnetic energy below the diffraction limit. The present invention addresses these needs.

SUMMARY OF THE INVENTION

The present invention is directed to an optoelectronic device and related method in which nanoparticles are arranged in chains or "wires" for the transfer and control of electromagnetic energy in a variety of circuit configurations. The particles are spaced apart along a preselected path such that electrical polarization of one of the particles acts to induce a corresponding polarization in an adjacent one of the particles. These devices rely on near-field interaction between the nonoparticles to set up coupled polarization or plasmon modes. Although the coupling is believed to be primarily of dipoles created in the particles, in some cases the coupling can be part dipole and part higher order multiple.

The particles of a chain may include metals, semiconductors or other materials capable of being polarized, and polarization of a first particle may be created by light. The particles themselves may be individual atoms or molecules, or aggregations of atoms and/or molecules, and may be separated by dielectric particles or coated with dielectric materials to create the required spacing. In one embodiment, the particles are metallic and interact with each other through coupling of plasmon modes.

In a another embodiment, the optoelectronic device of the invention extends from an input device, which may be a light source, to an output at a terminal portion of a chain. The output device may be a detector of light or any other electromagnetic output of the chain, or it may be a waveguide or other suitable device. The spacing between particles may be uniform or nonuniform, and the chain may form arbitrary angles without affecting the efficiency of energy transmission.

The device may function as a switch, a filter or other suitable device, depending on configuration and use. Specifically, a first group of nanoparticles may extend along a primary path from a first end to a second end of the device, and a second group of nanoparticles may extend along a secondary path intersecting the primary path between the ends of the primary path, to modulate propagation of a polarization signal along the primary path. Modulation occurs by constructive or destructive interference between signals along the two paths, and it is possible to null the signal on the primary path by appropriate choice of the magnitude and polarization of the modulating signal.

BRIEF DESCRIPTION OF THE DRAWINGS

The above and other features of the present invention may be more fully understood from the following detailed description, taken together with the accompanying drawings, wherein similar reference characters refer to similar elements throughout and in which.

DETAILED DESCRIPTION OF THE INVENTION

Figure 1:
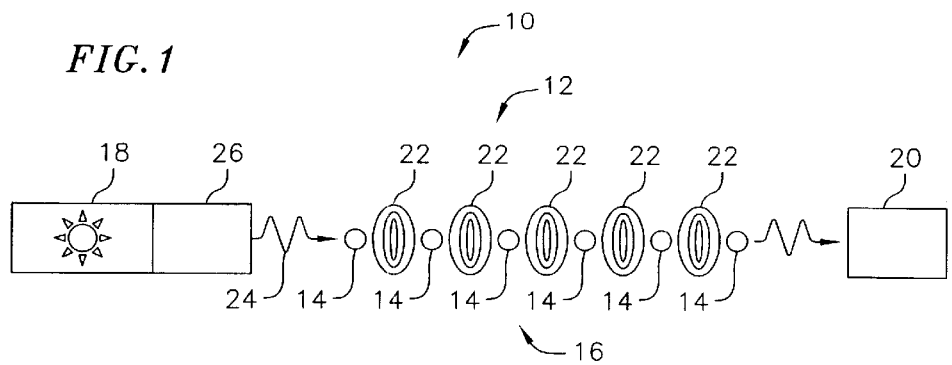
FIG. 1 is a schematic representation of an optoelectronic device constructed according to one illustrative embodiment of the invention, in which a plurality of nanoparticles are arranged in a straight line.

Referring to FIG. 1, a novel optoelectronic device 10 according to one embodiment of the invention has a chain 12 of nanometer-scale particles 14 spaced apart along a path 16 from an input device 18 to an output device 20 for the transfer of electromagnetic energy along the path. The particles 14 are capable of being polarized by electromagnetic energy, preferably in the form of light, from the input device 18, to propagate a polarization signal from one particle to the next.

Figure 7A:
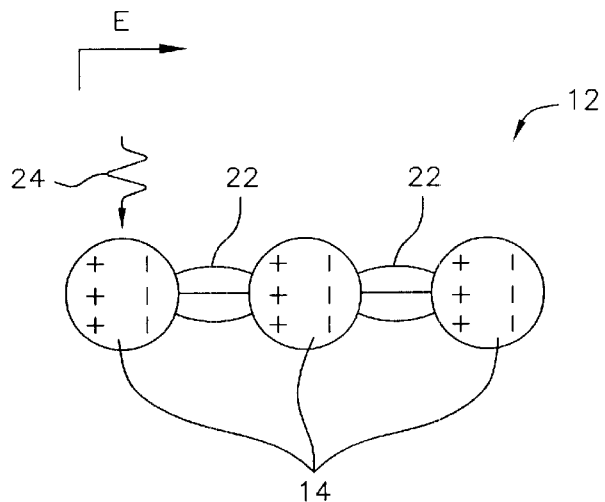
FIG. 7a is a diagrammatic representation of a chain of nonoparticles constructed according to an illustrative embodiment of the invention, showing the application of a transverse polarization of electrical charge to the nanoparticles.
Figure 7B:
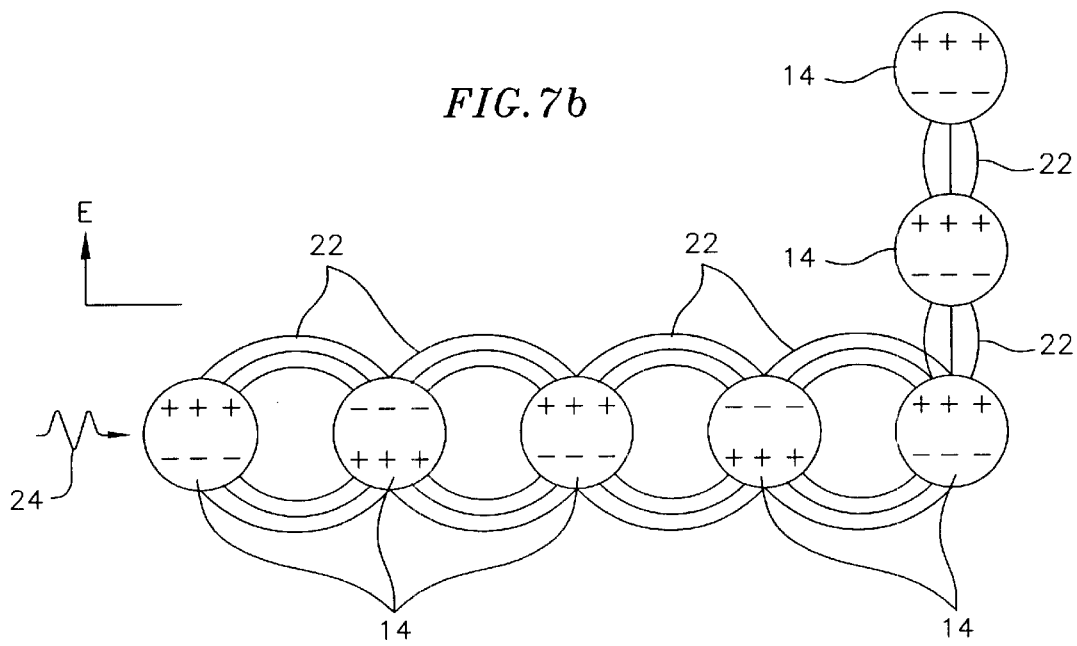
FIG. 7b is a diagrammatic representation of a chain of nonoparticles constructed according to an illustrative embodiment of the invention, showing the application of a longitudinal polarization of electrical charge to the nanoparticles.

The device 10 relies on near-field interaction between the particles 14 to set up coupled polarization or plasmon modes to transfer energy along the path 16. These interactions are illustrated schematically by a set of field lines 22. FIGS. 7a and 7b show possible configurations of the field lines in greater detail. Considering the case in which the initiating signal is light, FIG. 7a illustrates a beam of light 24 impinging on a first particle 14 from a lateral direction, creating a longitudinal polarization (L) in which electric charge within the particles is displaced substantially in the direction of the chain 12. This occurs due to the transverse orientation of the electric field vector (E) relative to the direction of the light. As shown in FIG. 7a, in this configuration the electric field lines 22 between adjacent particles are fairly compact. FIG. 7b illustrates the somewhat different case of light impinging on the first particle in a longitudinal direction, creating a transverse (T) polarization and a less compact arrangement of the electric field lines 22. As will be discussed more rigorously below, the longitudinal (L) and transverse (T) coupling configurations also result in different speeds of energy transport.

The particles 14 may be any of a variety of types as long as they are considerably smaller than the diffraction limit ($\lambda/2n$, where $\lambda$ is the wavelength of the transported energy and n is the refractive index of the medium through which the energy is transmitted) and can be suitably polarized. In any such case, conductive portions of the particles are separated from one another to form a discontinuous path of conductive material which nevertheless serves quite effectively to transmit energy from one point to the other. Thus, the particles, as a group, serve the basic function of a continuous path for information transport and therefore may be considered as a "plasmonic wire." In one significant embodiment, the particles are metal particles between approximately 2 nanometers and eighty nanometers in radius. Metals are useful because they have a large number of free electrons which can be displaced to produce distinct plasmon modes, and because they absorb light strongly. Metal nanoparticles, in particular Au, Cu and Ag, strongly absorb light in the ultraviolet to near-infrared portion of the spectrum and convert the energy efficiently into collective electron motion. The exact frequency of strongest absorption depends on the metal, the particle shape and the host material. Semiconductor materials and the rare earth elements are useful for these purposes, as well. Alternatively, the particles 14 may be individual atoms or molecules, either organic or inorganic. In one specific embodiment, the particles are Ag particles approximately 25 nanometers in radius, with a center-to-center spacing of 75 nanometers.

Figure 6:
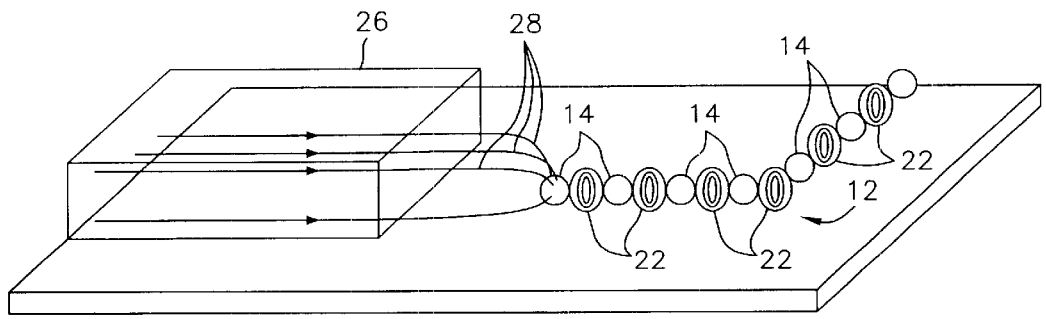
FIG. 6 is a somewhat diagrammatic representation of an optoelectronic device constructed according to an illustrative embodiment of the invention, showing the coupling of a chain of nanoparticles with an optical waveguide.

Referring in greater detail to FIG. 1, the input device 18 may be a light source (either coherent or incoherent) coupled to the first of the particles 14 by an optical waveguide 26, and the output device 20 may be an optical detector. Due to the diffraction limit described above, however, there is an intrinsic size mismatch between the waveguide 26 (typically ≧250 nanometers) and the first of the nanoparticles 14 (typically ~50 nanometers). This is dealt with by operating at the surface plasmon resonance frequency, at which the absorption cross section of the metal particles can easily be increased by more than an order of magnitude. An input coupler operating at the surface plasmon frequency is shown schematically in FIG. 6, where the flow of electromagnetic energy from the waveguide 26 to a first metal nanoparticle 14 is indicated by field lines 28. The effect of resonant enhancement of the particle's absorption cross section is shown by the bending of these lines toward the particle. Thus, the light of the waveguide is effectively focused into the first particle of the chain.

Considering the physics of the nanoparticle chain in greater detail, it is well established that at the surface plasmon frequency light strongly interacts with metal particles and excites a collective electron motion, or plasmon. These frequencies are typically in the visible and near infrared part of the spectrum. In nanometer size particles (much smaller than the wavelength of the exciting light, $\lambda$), plasmon excitations produce an oscillating dipole field. The dipole field produced by one particle can efficiently be coupled into another particle if in close proximity to the first (distance<<$\lambda$). In fact, it can be shown that coherent energy transport occurs along a chain of equally-spaced metal nanoparticles due to the near-field electrodynamic interaction between the metal particles. This results in the existence of coupled dipole or plasmon waves. This type of coupling is analogous to the process of resonant energy transfer, which is observed in systems that contain closely-spaced optically-excited atoms, molecules, or semiconductor nanocrystals. For this reason plasmonic devices can be made out of these entities, as well.

The transport of waves is often characterized by a so-called dispersion relation. Using the dispersion relation, one can determine, among other things, the following:

1) the frequencies and polarization directions of the plasmon waves that can be transported along a plasmon wire structures;
2) the velocity at which information can the transported through plasmonic structures; and
3) the frequency and polarization dependence of the transmission efficiency around corners.

Figure 10:
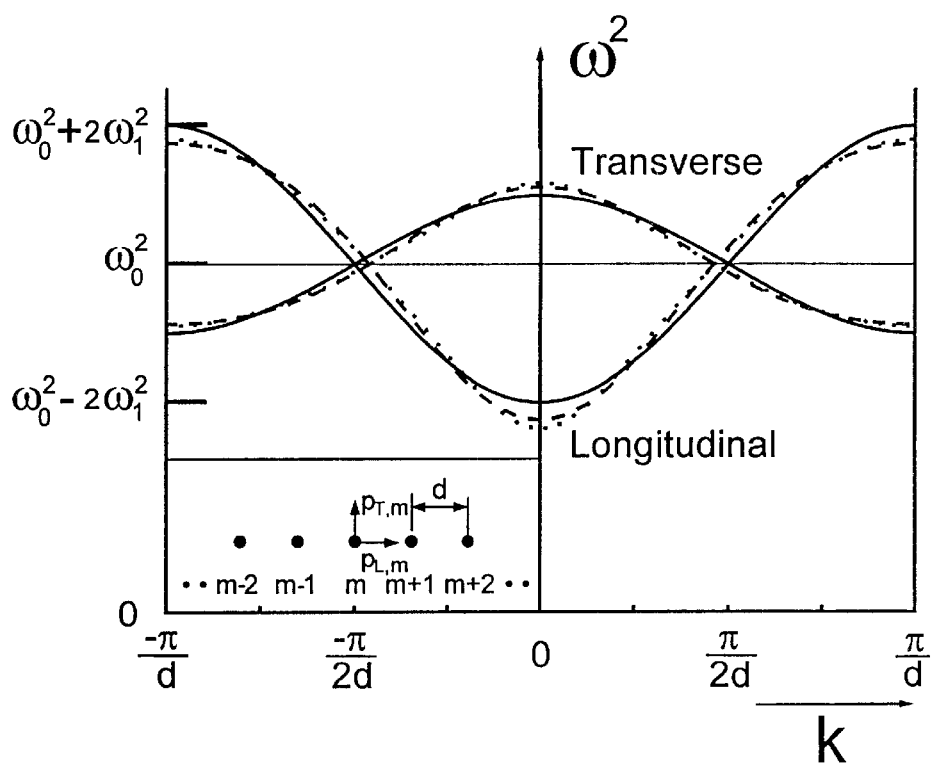
FIG. 10 is a graph of the dispersion relation calculated for a linear chain of equally spaced metallic nanoparticles.

In order to better understand the transport occurring in plasmon wire structures, consider a linear chain of equally-spaced metal particles separated by a distance d, where each particle is uniquely identified by an index m, as shown in the inset of FIG. 10. If a plasmon wave were to propagate along this array, each particle in the chain would have a certain dipole or other polarization moment $p_{i,m}(t)$, where i denotes the polarization direction of the plasmon wave. Transverse (T) plasmon modes have polarization moments oriented perpendicular to the chain axis and longitudinal (L) plasmon modes have dipole moments along the propagation direction, where a mode is defined by the magnitude of the induced dipole moments at each particle. The transport characteristics are determined by the strength of the electromagnetic coupling between the particles. Due to this coupling, the electron motion in one particle is affected by the electron motion in its neighbors. In other words, the polarization moments of all particles in the chain are coupled. One can show this effect mathematically in the equation of motion for a dipole at an arbitrary location, m, in the chain. If only nearest neighbor interactions are considered, the equation of motion is given by:

$$\ddot{P}_{i,m}(t) = -\omega_0^2 P_{i,m}(t) - \gamma_i \omega_1^2 [P_{i,m-1}(t) + p_{m+1}(t)]$$

The first term of equation (1) describes the dipole eigen-motion (oscillatory motion without interaction with its neighbors) at an angular resonance frequency $\omega_0$. The second term incorporates electrodynamic interaction with the nearest neighbor dipoles at m−1 and m+1. This term is responsible for the existence of propagation wave solutions. The coupling strength is determined by the magnitude of $\gamma_i$ and $\omega_1^2$, where $\gamma_i$ is a polarization dependent constant for which $\gamma_T = 1$ and $\gamma_L = -2$. This shows that the coupling between dipoles for longitudinal modes is twice as strong as the coupling for transverse modes. For near-field coupling, it can be shown that $\omega_1^2 = \rho V e/4 \Pi m \star \in_0 n^2 d^3$, where $\rho$ is the charge density in the particle, V is the volume of the particle, e the electron charge, $m\star$ the optical effective electron mass, $\in_0$ is the free space permittivity, and n is the refractive index of the host material. This indicates that the strength of the coupling is reduced when the distance between the particles is increased, the refractive index n of the host is increased, or the volume of the particle is reduced. As an example, for an array of 25 nm radius Ag particles spaced by 75 nm in vacuum (n=1), $\omega_1 = 1.4 \times 10^{15}$ rad/s$^{-1}$. For this calculation we have used $\rho = 5.85 \times 10^{22}/\text{cm}^3$ and $m\star = 8.7 \times 10^{-31}$ kg, which are values for Ag. It should be noted that this equation of motion is derived assuming nearest neighbor dipole-dipole interaction and does not include damping effects. It is straightforward to include interactions between more distant neighbors, higher order interactions (e.g. quadrapole), and damping effects.

The equation of motion has propagating wave solutions that look like:

$$P_{i,m}(t) = P_i \exp i(\omega t \pm kmd)$$

where $P_i$ is the maximum value of the dipole moment in the direction i, and k is the wave vector ($k = 2\Pi/\lambda$) of the plasmon wave. The dispersion relation is found by substitution of equation 2 into equation 1:

$$\omega^2 = \omega_0^2 + 2\gamma_i \omega_1^2 \cos(kd)$$

This relation is plotted in FIG. 10 for both the T and L modes. Also plotted are dispersion curves calculated including next nearest neighbor interactions (dashed curves), and up to 5$^{th}$ nearest neighbor interactions (dotted curves). It is clear that nearest neighbor interactions are most significant for the transport properties of the nanoparticle chains. As can be seen in the figure, the dispersion relation relates the excitation frequency of the plasmon wave to its k vector (or $\lambda$) for all of the allowed plasmon modes. For example, excitation of a plasmon wire at $\omega_0$ results in a k vector of $\Pi/2d$ (or $\lambda = 4d$) for both the longitudinal and transverse waves. Furthermore, it can be seen that plasmon modes exist only in a certain frequency band around $\omega_0$, the bandwidth $\Delta\omega$ of the plasmon modes. The group velocity $v_{g,i}$ (the velocity of information transport) can be calculated from the slope of the dispersion relation. Very generally, for any type of wave it holds that $v_{g,i} = d\omega/dk = (d\omega^2/dk)/(d\omega^2/d\omega) = \gamma_i \omega_1^2 d \sin(kd)/\omega$. Since $d\omega^2/dk$ is the slope of the dispersion curves in FIG. 10, it can easily be seen that at a given $\omega$ the L-waves propagate faster than the T-waves. At resonance, the group velocities for both the L-wave and the T-wave are maximum and $v_{g,L} = 2v_{g,T}$. This results from the stronger EM coupling for L-waves than for T-waves. For an array of 25 nm radius Ag particles spaced by 75 nm in vacuum (n=1), we find that the group velocities at resonance are $v_{g,T} = 2.9 \times 10^7$ m/s and $v_{g,L} = 5.8 \times 10^7$ m/s. These values are about two orders of magnitude higher than the saturation velocities of electrons in semiconductors. For these parameters, the corresponding bandwidths are $\Delta\omega_T = 7.9 \times 10^{14}$ s$^{-1}$ (520 meV) and $\Delta\omega_L = 1.6 \times 10^{15}$ s$^{-1}$ (1.05 eV).

Although the parameters of the optoelectronic device 10 can vary significantly depending on circumstances, the following parameters are preferred for certain particular embodiments of the invention:

|  | Preferred | More Preferred | Most Preferred |
|---|---|---|---|
| Radius (r) of Metal Nanoparticles | $2 \text{ nm} - \frac{\lambda}{4\text{ n}}$ | 10–40 nm | 25 nm |

-continued

| | Preferred | More Preferred | Most Preferred |
|---|---|---|---|
| Spacing (d) of Nanoparticles | $5\text{ nm} - \frac{\lambda}{4n}$ | 20–80 nm | 75 nm |
| Length (L) of chain | $.1\ \mu\text{m} - \frac{10}{\alpha}\mu\text{m}$ | 1–5 $\mu$m | 2 $\mu$m |
| Optical Index ($n_{host}$) | 1–4 | 1.2–3 | 1.5 |
| Damping ($K_{host}$) | $\ll \alpha$ | $<1\ \mu\text{m}^{-1}$ | |
| Wavelength ($\lambda$) | 250 nm–2.5 $\mu$m | 300 nm–1.6 $\mu$m | 850 nm; 1.3 $\mu$m; 1.5 $\mu$m |
| Optical Cross Section ($\sigma_{opt}$) | 1–10 $\Pi r^2$ | — | ~5 $\Pi r^2$ |
| Electron Density ($n_e$) | $10^{18}$–$10^{24}$ cm$^{-3}$ | ~$10^{23}$ cm$^{-3}$ | $5.86 \times 10^{22}$ cm$^{-3}$ (Ag) |
| $\phi$ (Radians) | 0–$\Pi$ | — | $\sim \frac{\pi}{2}$ |
| Polarizable Materials for Nanoparticles | Ag; Au; Na; Cu; Al; GaN; $Al_2O_3$; $SiO_2$; ZnO; polymer (e.g. polyamide) | Ag; Au; $SiO_2$; $Al_2O_3$ or combinations | |

Figure 2:
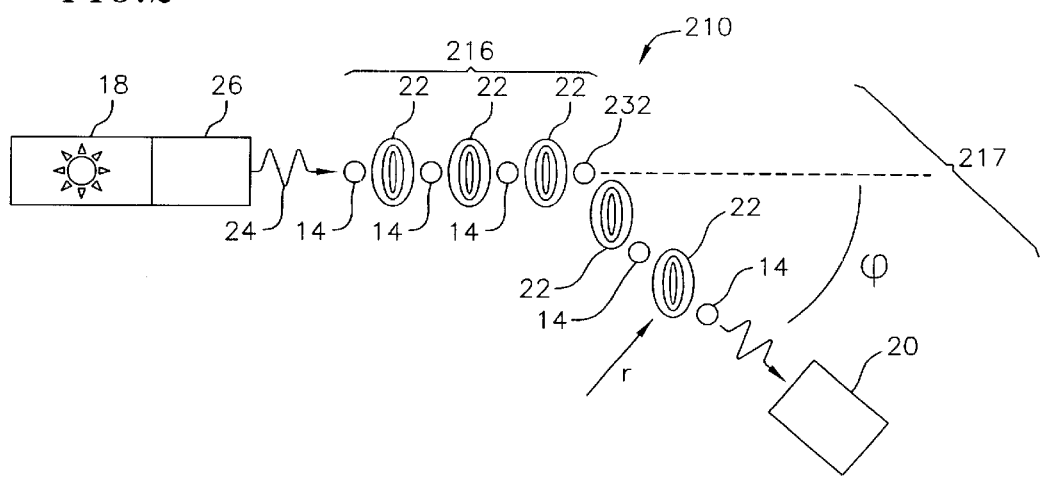
FIG. 2 is a schematic representation of an optoelectronic device constructed according to another illustrative embodiment of the invention, in which a plurality of nanoparticles are arranged in an angled configuration.

Referring now to FIG. 2, an optoelectronic device 210 constructed according to an alternative embodiment of the invention extends between a light source 18 and an output device 20 of the type described above in connection with FIG. 1. The device 210 has a chain 212 of nanoparticles 14 defining a first path segment 216 and a second path segment 217 connected end-to-end to form an angle $\phi$ therebetween. For purposes of generality, the second path segment 217 is also shown in FIG. 2 as potentially being curved to a radius r. In this case the polarization of the particles 14 is transmitted in series along the first path segment 216 and the second path segment 217, resulting in an output signal 230 at a detector or other output device 20. The polarization traverses the transition point 232 between the two path segments, and traverses the curved length of the second path segment 217, without a significant loss of intensity. Only the orientation of the polarization relative to the direction of the path changes, as shown by the change in orientation of the field interaction symbols 22.

Figure 3:
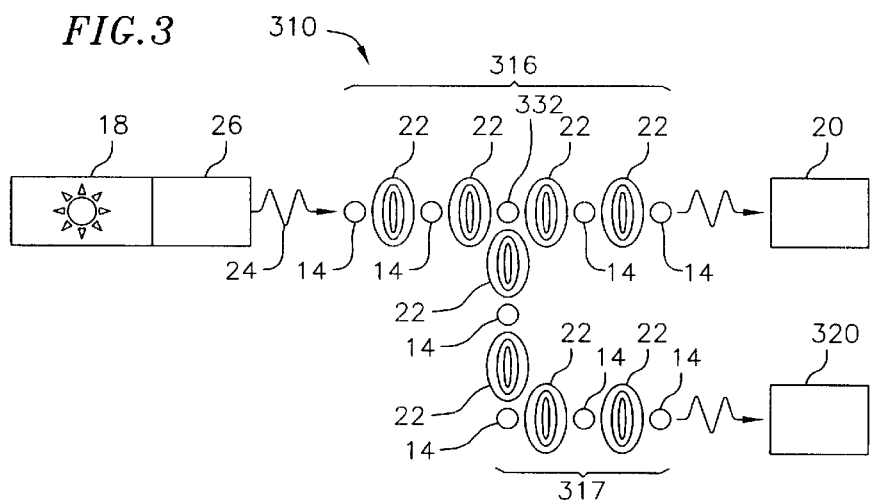
FIG. 3 is a schematic representation of an optoelectronic device constructed according to a further illustrative embodiment of the invention, in which a plurality of nanoparticles are arranged in a configuration having a pair of separate output branches.

An optoelectronic device 310 of FIG. 3 is a form of signal splitter. It has a primary path 316 of nanoparticles extending between an input device 18 and a primary output device 20 of the type illustrated in FIG. 1, but also has a secondary path 317 branching out from the primary path at a location 332 at an angle of approximately ninety degrees (90°). The secondary path 317 itself contains another ninety degree (90°) turn before it reaches a secondary output device 320. As demonstrated mathematically below, the polarization signal imposed by the light source 18 couples efficiently through the branch 332 and the turn in the secondary path 317, with the only significant effect of these features being the amount and polarization of the light reaching the two output devices. Thus, the device 310, in its generalized form, functions as a signal splitter or a filter of the applied optical signal according to the coupling principles set forth below.

Figure 4:
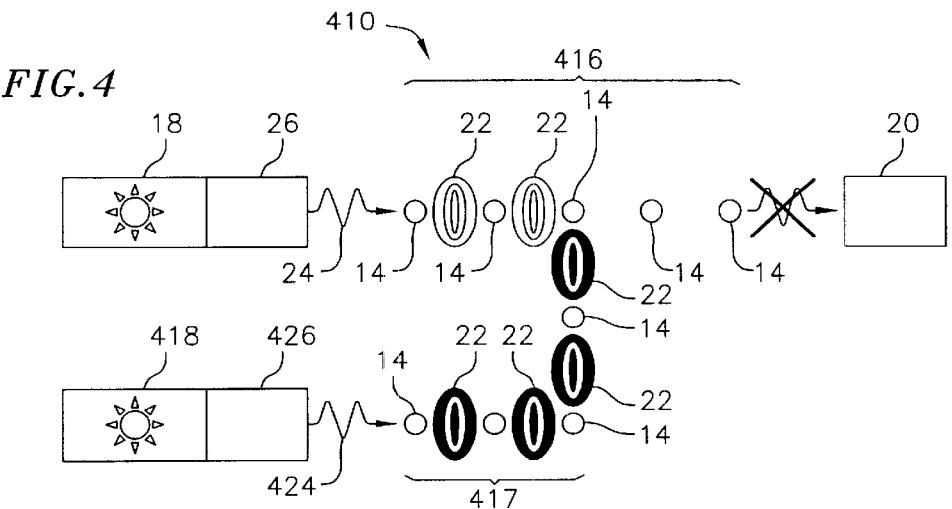
FIG. 4 is a schematic representation of an optoelectronic device constructed according to yet another illustrative embodiment of the invention, in which a plurality of nanoparticles are arranged in a configuration having a pair of input branches terminating in a single output.

FIG. 4 depicts an optoelectronic device 410 which is a modulator or switch of the nanoparticle type. The device 410 has a primary path 416 of polarizable closely-spaced nanoparticles 14 extending between a first light source 18 and a terminal device 20, with a secondary path emanating from a second light source 418, extending through a ninety degree (90°) turn, and joining the primary path at an intersection point 432. As demonstrated mathematically below, the interaction of the signals from the two light sources (18 and 418) depends on their relative frequencies, phases and polarizations, enabling the signal from the first light source 18 along the primary path 416 to be modulated, and even nulled, as desired. For complete destructive interference to occur, the wave sent out by the input devices 18 and 418 should be out of phase and have the same polarization direction at the point of intersection.

Figure 5:
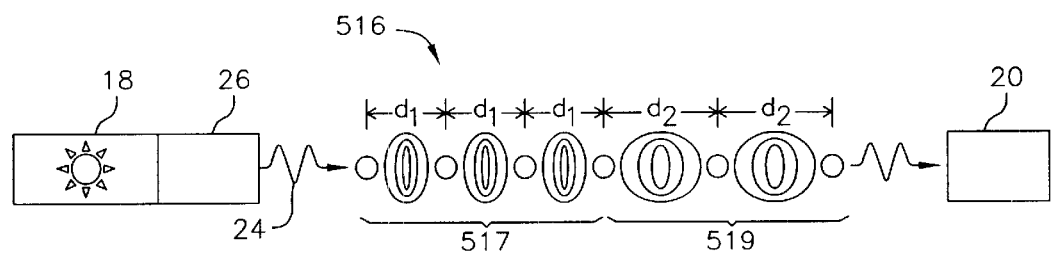
FIG. 5 is a schematic representation of an optoelectronic device constructed according to a still further illustrative embodiment of the invention, in which a plurality of nanoparticles have different spacings between them.

Considering again the theory of the plasmonic devices of the invention, the transport of electromagnetic energy through corners and tee-junctions, as implemented in the embodiments of FIGS. 2, 3 and 4, can be calculated by requiring continuity of the plasmon waves and conservation of energy flux at the intersection of the chains. In general, part of the incident wave flows through the structure and part is reflected. The efficiency of the power transmission depends on the geometry of the structure, and the frequency and polarization directions of the plasmon waves that enter and exit a structure. As an example, we consider some structures that consist of chains and right angle corners. This greatly simplifies the modeling since in that case only three situations need to be distinguished: 1) in a turn an L-wave transforms into a T-wave, 2) in a turn a T-wave transforms into an L-wave, and 3) in a turn a T-wave remains a T-wave. At certain values of $\omega$, the importance of the frequency and polarization direction is manifested in the dispersion relation showing only L-modes can exist and T-modes are forbidden. This implies that a right angle corner in which L-waves are transformed into T-waves acts as a frequency or polarization filter. It can also be shown that the transmission efficiency through any structure is maximum at $\omega = \omega_0$, and in this discussion the value of $\omega_0$ is assumed. FIG. 2 shows calculated power transmission coefficients, $\eta$, in the nearest neighbor approximation for all realizable right angle corner and tee structures. A $\eta$-value of 1 corresponds to 100% transmission. Notice that all structures have $\eta$-values exceeding 0.64, showing that power flow around right angle corners with dimensions much smaller than the wavelength of light is possible at high efficiencies. This is impossible in conventional dielectric waveguide technology, and is more akin to certain photonic crystal structures. Beyond the nearest neighbor dipole-dipole interaction approximation, more detailed analysis of plasmon wire structures can be made through full field electromagnetic simulations using, e.g., finite difference time domain calculations. It should be noted that the examples given above discuss structures for which the interparticle spacing is the same throughout the structure. This is definitely not a necessary requirement. In fact, structures may consist of various segments having different interparticle-spacing or other structures may have a non-periodic particle spacing, as illustrated in FIG. 5. With reference to FIG. 5, polarizable nanoparticles 14 can be given different spacings, if desired. Thus, a path 516 of polarizable nanoparticles can be formed of a first path segment 517 and a second path segment 519 to couple an input device 18 to an output device 20. In this embodiment, the path segment 517 has a center-to-center particle spacing of $d_1$, while the path segment 519 has a particle spacing of $d_2$.

Figure 12:
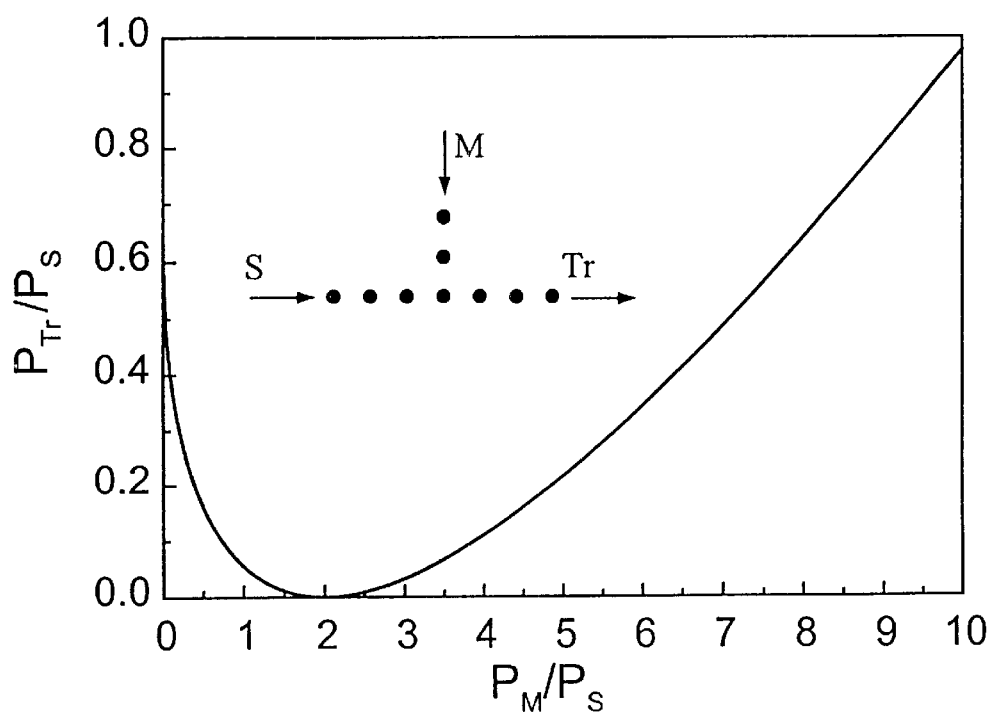
FIG. 12 is a graph showing the proportion of electromagnetic energy transmitted by a chain of nanoparticles constructed according to the invention under different conditions of modulation by a separate applied signal.

The interference between the various signals of the modulation device 410 of FIG. 4 is illustrated graphically in FIG. 12. These signals are the modulating signal (M) of the light source 418, the primary signal (S) of the light source 18, and the transmitted signal (T) reaching the terminal device 20. The decreasing portion of the curve on the left hand side of the graph represents the increasing destructive interference resulting from increasing power of the modulating signal M. At a value of $P_M/P_S$ equal to 2, the transmitted power $(P_{Tr})$ is zero, signifying complete nulling of the signal S. Thereafter, when the modulation signal increases even more, the transmitted signal T also increases.

Figure 11:
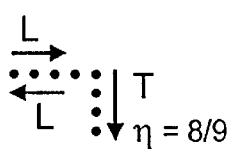
FIG. 11 is a chart of the power transmission coefficients calculated for arrangements of nanoparticles of the invention under a variety of signal conditions.

FIG. 11 provides values of the transmission power coefficient (η) for each possible combination of input signal and path type. For example, as shown in the upper left hand box of the chart, a longitudinally polarized signal L reaching a right angle turn in the particle path will have ⅘ of its power transmitted through the right angle turn and ⅕ of its power reflected back along the original path. An examination of each of these possible scenarios reveals that in all cases η exceeds 0.64, showing that power flow around right angle corners with dimensions much smaller than the wavelength of light is possible at high efficiencies. It can be shown that these efficiencies are even further enhanced by choosing a different interparticle spacing before and after the corner.

Figure 9A:
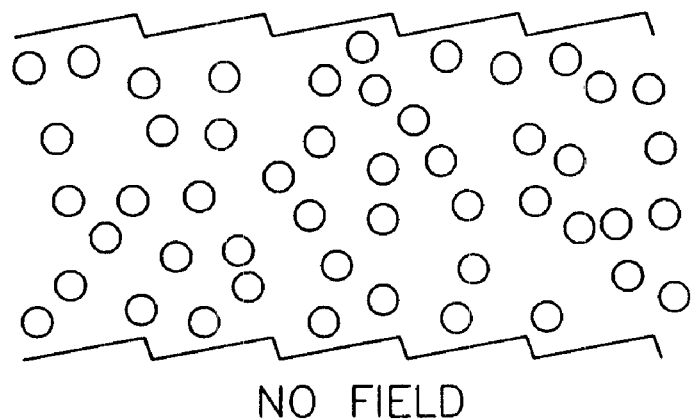
FIG. 9a is a diagrammatic representation of a plurality of disordered nonoparticles positioned on a faceted support structure in the absence of an applied field.
Figure 9B:
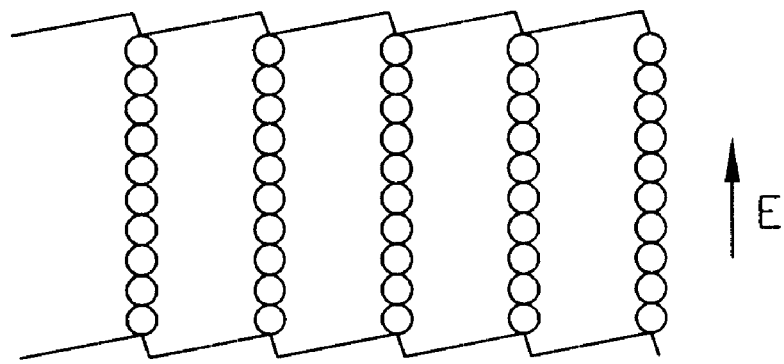
FIG. 9b is a diagrammatic representation of the nonoparticles of FIG. 9a under the influence of an applied field.

The polarizable nonoparticles 14 of the invention can be fabricated by a number of different techniques, including a form of "self-assembly" which makes use of the tendency of polarizable particles to assume an ordered arrangement in a fluid phase. This tendency is characterized by the ratio of the polarization to thermal energy, λ. For electrical dipoles, $\lambda = \Pi \in_0 \in a^3 (\beta E)^2 / kT$, so the field strength, E, required to exceed the critical value of λ=5 needed to induce ordering, depends strongly on the particle radius, a, and on the dielectric mismatch between the fluid (dielectric constant ∈) and the particle $(\in_p)$, $\beta = (\in_p - \in)/(\in_p + 2\in)$. The equilibrium chain length increases with λ and with the particle volume fraction. For any value of λ there is a critical volume fraction that will lead to unbounded chain length. The field strengths required to induce ordering of nanoparticles are high, so this approach will apply to particles that are larger than a threshold size related to the breakdown field for the fluid. To produce chains separated by appropriate distances, the alignment electrodes will have modulated surfaces, perhaps by using a vicinally-cut Si crystal facetted by anisotropic KOH etching to produce steps as illustrated in FIGS. 9a and 9b. FIG. 9a shows a disordered array of nanoparticles over a faceted supporting surface, and FIG. 9b shows the same particles under the influence of an electric field, E, applied in the indicated direction. The lines of particles created in FIG. 9b are representative of the arbitrary linear arrays of such particles obtainable using this method.

Alternatively, the nanoparticles 14 can be formed by lithography, and specifically by electron beam lithography, sometimes using ion beam etching to assist in device fabrication. These techniques are particularly flexible in the fabrication of very small structures where control over periodicity and absolute position are critical, and enables arbitrary shape and feature definition to be achieved.

Figure 8A:
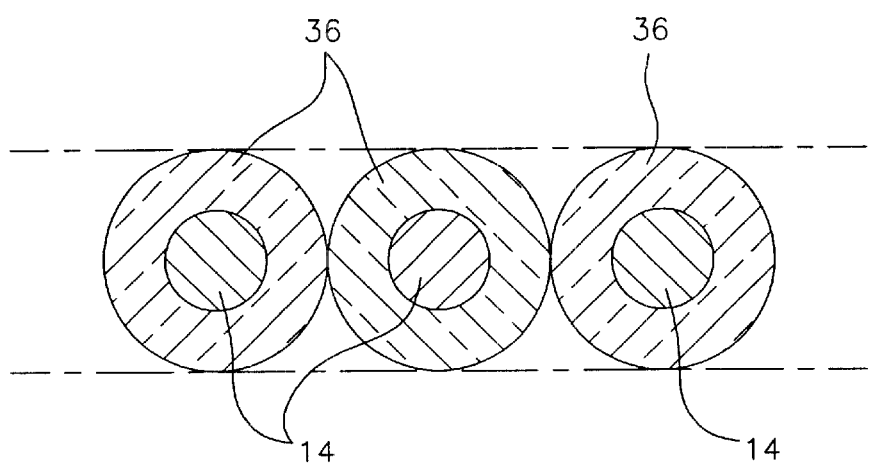
FIG. 8a is an idealized cross-sectional view of a chain of three nanoparticles constructed according to an illustrative embodiment of the invention, the particles being encapsulated by a dielectric material.
Figure 8B:
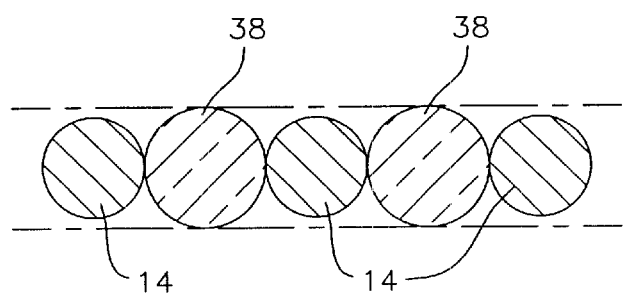
FIG. 8b is an idealized cross-sectional view of a chain of three nanoparticles constructed according to another illustrative embodiment of the invention, the particles being separated by separate particles of a dielectric material.

Two simple, yet effective techniques for spacing the conductive portions of the particles is to encapsulate them within a dielectric medium, such as glass shells 36 (FIG. 8a), or separate them by dielectric particles 38 (FIG. 8b).

While the foregoing description contains many specific features of the invention, these should not be construed as limitations on the scope of the invention, but rather as specific exemplary embodiments thereof. Many other variations are possible. Accordingly, the scope of the invention should be determined not by the embodiments illustrated, but by the appended claims and their legal equivalents.

What is claimed is:

1. An optoelectronic device comprising:

a plurality of nanometer-scale particles arranged along a preselected path, each particle capable of being polarized;

said particles being spaced apart such that polarization of one of said particles acts to induce polarization in an adjacent one of said particles.

2. The optoelectronic device of claim 1 wherein:

the spacing between the particles is uniform.

3. The optoelectronic device of claim 1 wherein:

the spacing between the particles is nonuniform.

4. The optoelectronic device of claim 1 wherein:

the particles are arranged so that a polarization created in one of the particles propagates along said path to a terminal portion thereof; and the optoelectronic device includes an output device at said terminal portion for receiving the propagated polarization.

5. The optoelectronic device of claim 4 wherein:

said output device is an optical detector.

6. The optoelectronic device of claim 4 wherein:

said output device is an optical waveguide.

7. The optoelectronic device of claim 4 which further comprises:

an input device for creating a polarization in at least one of said particles.

8. The optoelectronic device of claim 7 wherein:

said input device comprises a light source.

9. The optoelectronic device of claim 8 wherein:

said light source is coupled to at least one of the particles by an optical waveguide.

10. The optoelectronic device of claim 7 wherein:

said nanometer-scale particles are arranged in a line.

11. The optoelectronic device of claim 10 wherein:

said line comprises at least two adjacent segments having different interparticle spacings.

12. The optoelectronic device of claim 10 wherein:

said line comprises at least two adjacent segments angled with respect to each other.

13. The optoelectronic device of claim 10 wherein:

said line comprises at least one curved segment subtending a substantially right angle.

14. The optoelectronic device of claim 7 wherein:

a first group of said nanometer-scale particles extend along a primary path from a first end to a second end; and a second group of said nanometer-scale particles are arranged along a secondary path intersecting the primary path between said first and second ends to modulate propagation of a polarization signal along said primary path.

15. The optoelectronic device of claim 1 wherein:

said nanometer-scale particles comprise a metal.

16. The optoelectronic device of claim 1 wherein:

said nanometer-scale particles comprise a semiconductor.

17. The optoelectronic device of claim 1 wherein:

said nanometer-scale particles comprise conductive particles encapsulated within a dielectric material.

18. The optoelectronic device of claim 1 wherein:

said nanometer-scale particles comprise conductive particles separated by nanometer-scale particles of a dielectric material.

19. The optoelectronic device of claim 1 wherein:
said nanometer-scale particles comprise optically active atoms.

20. The optoelectronic device of claim 1 wherein:
said nanometer-scale particles comprise optically active molecules.

21. The optoelectronic device of claim 1 wherein:
said nanometer-scale particles comprise optically active atoms and molecules.

22. A method of fabricating an optoelectronic device comprising:
providing a plurality of nanometer-scale particles arranged along a preselected path, each particle capable of being polarized;
spacing said particles apart such that polarization of one of said particles acts to induce polarization in an adjacent one of said particles.

23. The fabrication method of claim 22 which further comprises:
arranging the particles so that a polarization created in one of the particles propagates along said path to a terminal portion thereof; and
providing an output device at said terminal portion for detecting the propagated polarization.

24. The fabrication method of claim 23 which still further comprises:
providing an input device for creating a polarization in at least one of said particles.

25. The fabrication method of claim 23 wherein the step of arranging the particles comprises:
arranging the particles in a line.

26. The fabrication method of claim 23 wherein the step of arranging the particles comprises:
arranging the particles in a line having at least two adjacent segments angled with respect to each other.

27. The fabrication method of claim 23 wherein the step of arranging the particles comprises:
providing a first group of said nanometer-scale particles extending along a primary path from a first end to a second end; and
providing a second group of said nanometer-scale particles arranged along a secondary path intersecting the primary path between said first and second ends to modulate propagation of a polarization signal along said primary path.

28. The fabrication method of claim 22 wherein the step of providing a plurality of nanometer-scale particles arranged along a preselected path comprises:
assembling such particles along faceted lines of a support structure under the influence of an applied field.

29. The fabrication method of claim 22 wherein the step of providing a plurality of nanometer-scale particles arranged along a preselected path comprises:
patterning a suitable body of material by lithography.

30. The fabrication method of claim 22 wherein the step of providing a plurality of nanometer-scale particles arranged along a preselected path comprises:
patterning a suitable body of material by electron beam lithography.

31. The fabrication method of claim 22 wherein the step of providing a plurality of nanometer-scale particles arranged along a preselected path further comprises:
enhancing device structure by ion beam etching.

32. A method of optoelectronically transmitting an electromagnetic signal comprising:
applying a first electromagnetic signal to at least one particle of a first series of spaced-apart nanometer-scale particles arranged along a preselected path to polarize said particle; and
propagating said polarization along said path by inducing polarization in successive particles along the path; and
receiving said signal at a location along said path remote from said at least one particle.

33. The transmission method of claim 32 which further comprises:
propagating a second electromagnetic signal along a second series of spaced-apart nanometer-scale particles intersecting said preselected path to modulate the first electromagnetic signal.

34. The transmission method of claim 32 wherein:
the step of applying a first electromagnetic signal to at least one particle comprises illuminating said at least one particle to create a plasmon therein; and
the step of propagating said polarization along said path comprises inducing polarization along said path by plasmon interaction.

35. The transmission method of claim 32 wherein:
the first electromagnetic signal is applied to polarize said particle in a mode extending longitudinally relative to the preselected path.

36. The transmission method of claim 32 wherein:
the first electromagnetic signal is applied to polarize said particle in a mode extending transverse to the preselected path.

* * * * *